(12) United States Patent
Minge et al.

(10) Patent No.: US 8,148,465 B2
(45) Date of Patent: Apr. 3, 2012

(54) FREE-RADICAL POLYMERIZATION PROCESS

(75) Inventors: Oliver Minge, München (DE); Peter Ball, Emmerting (DE); Martin Bortenschlager, Bergkirchen (DE)

(73) Assignee: Wacker Chemie AG, Munich (DE)

( * ) Notice: Subject to any disclaimer, the term of this patent is extended or adjusted under 35 U.S.C. 154(b) by 227 days.

(21) Appl. No.: 12/517,723

(22) PCT Filed: Dec. 4, 2007

(86) PCT No.: PCT/EP2007/063227
§ 371 (c)(1),
(2), (4) Date: Nov. 3, 2009

(87) PCT Pub. No.: WO2008/071589
PCT Pub. Date: Jun. 19, 2008

(65) Prior Publication Data
US 2010/0081765 A1    Apr. 1, 2010

(30) Foreign Application Priority Data

Dec. 11, 2006 (DE) .......................... 10 2006 058 203

(51) Int. Cl.
| | |
|---|---|
| C08F 230/08 | (2006.01) |
| C08F 20/06 | (2006.01) |
| C08F 12/02 | (2006.01) |
| C08F 14/06 | (2006.01) |
| C08F 36/00 | (2006.01) |
| C08F 12/30 | (2006.01) |
| C08G 18/62 | (2006.01) |

(52) U.S. Cl. .............. 524/806; 524/832; 526/317.1; 526/346; 526/286; 526/344; 526/335

(58) Field of Classification Search .......... 524/806, 524/832; 526/317.1, 346, 286, 344, 335
See application file for complete search history.

(56) References Cited

U.S. PATENT DOCUMENTS 6,353,065 B1   3/2002  Charleux et al.
6,852,821 B1 * 2/2005  Bendix et al. ............. 526/347.1

FOREIGN PATENT DOCUMENTS

| DE | 19929395 | 12/2000 |
|---|---|---|
| EP | 0970973 | 1/2000 |
| WO | WO01/42311 | 6/2001 |

OTHER PUBLICATIONS

Lovell, et al., "Emulsion Polymerization and Emulsion Polymers", Book—table of contents, 1997, John Wiley & Sons, Chichester, England.
Antonietti, et al., "90 Years of Polymer Latexes and Heterophase Polymerization: More Vital Than Ever", Macromol. Chem. Phys., 2003, vol. 204, No. 2, pp. 207-219, Wiley-VCH, Weinheim, Germany.
Fox, T.G., Session J Bulletin, Am. Phys. Soc., 1, 3, p. 123, 1956.
Bandrup, J., et al., Polymer Handbook Second Edition, 1975, cover pp. (2), pp. III-139 to III-191, John Wiley and Sons, New York.
"McCutcheon's Detergents & Emulsifiers" North American Edition, book—table of contents, 1979, McCutcheon's Division, McPublishing Co., Glen Rock, NJ, USA.
"McCutcheon's Detergents & Emulsifiers" International Edition, book—table of contents, 1979, McCutcheon's Division, McPublishing Co., Glen Rock, NJ, USA.
"McCutcheon's Functional Materials", book—table of contents, 1979, McCutcheon's Division, McPublishing Co., Glen Rock, NJ, USA.
Landfester, Katharina, "Polyreactions in Miniemulsions", Macro. Rapid Commun., 2001, vol. 22, No. 12, pp. 896-936, Wiley-VCH, Weinheim, Germany.
El-Aasser, et al., "Miniemulsions: Overview of Research and Applications", JCT Research, 2004, vol. 1, No. 1, pp. 21-31, Emulsion Polymers Institute, Bethlehem, PA, USA.
Denisov, et al., "Handbook of Free Radical Initiators". Book, 2003, pp. vii-xxii, John Wiley & Sons, Inc., Hoboken, NJ, USA.
Queste, Sébastien, International Search Report, Sep. 8, 2008, 4 pp, European Patent Office, HV Rijswijk, The Netherlands.

* cited by examiner

*Primary Examiner* — William Cheung
(74) *Attorney, Agent, or Firm* — RatnerPrestia

(57) ABSTRACT

The invention relates to a process for free-radically initiated heterophase polymerization, in which the polymerization of ethylenically monomers proceeds in a phase dispersed in the continuous phase, characterized in that one or more additives which are soluble in the continuous phase and insoluble in the disperse phase and stop the polymerization of the ethylenically unsaturated monomers in the continuous phase is/are added before or during the polymerization.

7 Claims, No Drawings

FREE-RADICAL POLYMERIZATION PROCESS

This application is the U.S. National Phase Application of PCT International Application No. PCT/EP2007/063227, filed Dec. 4, 2007, which claims priority to German Patent Application No. 102006058203.9, filed Dec. 11, 2006, the content of such application.

The invention relates to a free-radical polymerization process in disperse phase, more particularly a miniemulsion polymerization process, in which the polymerization in the continuous phase is prevented.

Heterophase polymerization techniques are well established and have been performed for many decades on the industrial scale. Examples of such heterophase techniques are the polymerization processes, familiar to a person skilled in the art, of suspension polymerization, of microsuspension polymerization, of emulsion polymerization and of miniemulsion polymerization, as are described in, for example, Peter A. Lovell, M. S. El-Aasser, "Emulsion Polymerization and Emulsion Polymers" 1997, John Wiley and Sons, Chichester. The polymeric products obtained by means of these processes find use in cosmetics, detergents, adhesives, paints and inks, building materials and in the paper industry, to name but some of the applications. Now more than 10 million tonnes of polymer per year are produced by heterophase techniques (cf. M. Antonietti, K. Tauer, Macromol. Chem. Phys. 2003, 204, 2, 207-219).

The advantages of heterophase polymerizations over single-phase polymerizations, as represented, for example, by bulk polymerization or solution polymerization, are the more effective removal of heat, in association with a lower viscosity, leading to improved commixing and a considerably reduced risk of thermal explosions. With heterophase polymerizations, in addition, one phase is often water, and it is generally possible to do without organic solvents and so heterophase techniques also have great advantages from the standpoint of the environment. As a general rule, the products are in a particulate form, which is often of great advantage for subsequent use. Moreover, the multiphase products obtained in this way are often used directly, without further processing steps: for example, as binders of paints or as a component of adhesives. It is therefore often advantageous to perform a polymerization in heterogeneous phase.

Heterophase polymerization techniques are in many respects more complex than homogeneous polymerizations. One essential cause of this complexity is the different solubility of the building blocks for polymerization in the different phases, a fact which means that partition equilibria of the building blocks in the phases come about, and these building blocks are present at different concentrations in the different phases. In addition, these building blocks polymerize at different rates in the different phases, and in accordance with different kinetics, which means that, during the polymerization, there are transport processes of the building blocks between the phases, that have a great influence on the nature of the end product.

For instance, in the case of an emulsion polymerization, the initial emulsion is composed typically of dispersed, micrometer-sized monomer droplets in an aqueous continuous phase, these droplets, following addition of water-soluble initiators, being broken down in the course of the reaction as a result of phase transition in and transport processes through the aqueous phase, and so the product is a second phase of considerably smaller polymer particles, referred to as the latex. Often, however, it is desirable to obtain the particle size distribution that was set at the beginning and merely to fix it by polymerization.

One possibility of preventing this behavior is the use of oil-soluble initiators, so that the polymerization proceeds substantially in the disperse phase. In the case of suspension polymerization or microsuspension polymerization that then prevails, however, the water-solubility of numerous monomers means that there is often also a phase transport observed that leads to particle nucleation in the continuous water phase at the expense of the original particles. Frequently, moreover, the use of water-soluble initiators is desired, since they are easier to meter and permit greater diversity in terms of initiator decomposition kinetics.

One possibility of preventing this phenomenon of the phase transport that takes place is the process of miniemulsion polymerization. Here, by addition of a hydrophobe, an osmotic barrier is constructed which, ideally, prevents phase transport and hence the breakdown of the monomer droplets. The number and size distribution of the particles originally present in the emulsion is ideally fixed in this case and transferred into polymeric particles. Here, as well, nevertheless, unwanted polymerization processes take place in the water phase, especially when the monomers to be polymerized are monomers which have a comparatively high solubility in the continuous phase.

It was an object of the present invention, therefore, to develop a process which makes it possible, in free-radical polymerization processes in heterogeneous phase, to confine the location of the polymerization substantially to the disperse phase and/or largely to suppress the nucleation of particles in the continuous phase.

This object has been achieved by the addition to the polymerization formula of compounds which are essentially soluble only in the continuous phase and which, by virtue of their reactivity toward free-radical species, influence chain growth in this phase in such a way that the polymerization takes place substantially only in the disperse phases.

The invention accordingly provides a process for free-radically initiated heterophase polymerization, the polymerization of one or more ethylenically unsaturated monomers, selected from the group containing vinyl esters of unbranched or branched alkylcarboxylic acids having 1 to 15 C atoms, proceeding in a phase dispersed in the continuous phase, characterized in that, before or during the polymerization, one or more additives which are soluble in the continuous phase and insoluble in the dispersed phase are added which terminate the polymerization of the ethylenically unsaturated monomers in the continuous phase,
additives added being those from the group encompassing styryl-group-bearing polar or salt-like compounds which have unfavorable copolymerization characteristics with the monomers of the disperse phase.

The polymers obtained in the polymerization, and the monomers used for this polymerization, represent the dispersed (disperse) phase(s). Ethylenically unsaturated monomers suitable for the polymerization are one or more monomers from the group containing vinyl esters of unbranched or branched alkylcarboxylic acids having 1 to 15 C atoms, methacrylic esters and acrylic esters of unbranched or branched alcohols having 1 to 15 C atoms, vinylaromatics, olefins, dienes or vinyl halides, and also, where appropriate, further macromonomers or auxiliary monomers that are copolymerizable with them.

Preferred vinyl esters are vinyl acetate, vinyl propionate, vinyl butyrate, vinyl 2-ethylhexanoate, vinyl laurate, 1-methylvinyl acetate, vinyl pivalate, and vinyl esters of α-branched monocarboxylic acids having 9 to 11 C atoms, for example VeoVa9® or VeoVa10® (trade names of the company Resolution). Vinyl acetate is particularly preferred.

Preferred methacrylate esters or acrylic esters are methyl acrylate, methyl methacrylate, ethyl acrylate, ethyl methacrylate, propyl acrylate, propyl methacrylate, n-butyl acrylate, n-butyl methacrylate, isobutyl acrylate, isobutyl methacrylate, tert-butyl acrylate, tert-butyl methacrylate, 2-ethylhexyl acrylate, and norbornyl acrylate. Particular preference is given to methyl acrylate, methyl methacrylate, n-butyl acrylate, isobutyl acrylate, tert-butyl acrylate, 2-ethylhexyl acrylate and norbornyl acrylate.

Preferred vinyl aromatics are styrene, alpha-methylstyrene, the isomeric vinyltoluenes and vinylxylenes and also divinylbenzenes. Styrene is particularly preferred.

Among the vinyl halogen compounds, mention may be made of vinyl chloride, vinylidene chloride, and also tetrafluoroethylene, difluoroethylene, hexylperfluoroethylene, 3,3,3-trifluoropropene, perfluoropropyl vinyl ether, hexafluoropropylene, chlorotrifluoroethylene, and vinyl fluoride. Vinyl chloride is particularly preferred.

The preferred olefins are ethene, propene, 1-alkylethenes, and polyunsaturated alkenes, and the preferred dienes are 1,3-butadiene and isoprene. Ethene and 1,3-butadiene are particularly preferred.

Preferred macromonomers are singly or multiply ethylenically unsaturated molecules having number-average molar masses >400 g/mol, preferably >1000 g/mol. Suitable ethylenically unsaturated radicals of the macromonomers include vinyl, (meth)acrylic, allyl, styryl, norbornyl, and maleate radicals. The macromonomers may be linear or branched, but linear macromonomers are preferred. The framework of the macromonomers may be composed of poly(dialkylsiloxane)s, poly(diarylsiloxane)s, poly(alkylarylsiloxane)s, poly(ethylene oxide)s, poly(propylene oxide)s, poly(ethylene oxide-co-propylene oxide)s, poly(ester polyol)s, poly(amide)s, poly(ester)s, poly((meth)acrylate)s, poly(acrylamide)s, and poly(vinyl ester)s.

Preferably, the macromers are polysiloxane building blocks. Particularly preferred silicone macromers are silicones having the general formula R1aR3-aSiO(SiR2O)nSiR3-aR1a, where R is alike or different and is a monovalent, optionally substituted, alkyl radical or alkoxy radical having in each case 1 to 18 C atoms, R1 is a polymerizable group, a is 0 or 1, and at least one a is 1, and n is 5 to 10 000.

In the general formula R1aR3-aSiO(SiR2O)nSiR3-aR1a, examples of radicals R are methyl, ethyl, n-propyl, isopropyl, 1-n-butyl, 2-n-butyl, isobutyl, tert-butyl, n-pentyl, isopentyl, neopentyl, tert-pentyl radical, hexyl radicals such as the n-hexyl radical, heptyl radicals such as the n-heptyl radical, octyl radicals such as the n-octyl radical and isooctyl radicals such as the 2,2,4-trimethylpentyl radical, nonyl radicals such as the n-nonyl radical, decyl radicals such as the n-decyl radical, dodecyl radicals, such as the n-dodecyl radical, and octadecyl radicals such as the n-octadecyl radical, cycloalkyl radicals, such as cyclopentyl, cyclohexyl, cycloheptyl, and methylcyclohexyl radicals. Preferably, the radical R is a monovalent hydrocarbon radical having 1 to 6 carbon atoms, such as methyl, ethyl, n-propyl, isopropyl, n-butyl, sec-butyl, amyl and hexyl radical, the methyl radical being particularly preferred.

Preferred alkoxy radicals R are those having 1 to 6 carbon atoms, such as methoxy, ethoxy, propoxy and n-butoxy radical, which where appropriate may also be substituted by oxyalkylene radicals such as oxyethylene or oxymethylene radicals. The methoxy and ethoxy radical are particularly preferred. The stated alkyl radicals and alkoxy radicals R may where appropriate also be substituted, as for example, by halogen, mercapto groups, epoxy-functional groups, carboxyl groups, keto groups, enamine groups, amino groups, aminoethylamino groups, isocyanato groups, aryloxy groups, alkoxysilyl groups and hydroxyl groups.

Suitable polymerizable groups R1 are alkenyl radicals having 2 to 8 C atoms. Examples of polymerizable groups of this kind are the vinyl, allyl, butenyl and also acryloyloxyalkyl and methacryloyloxyalkyl group, the alkyl radicals containing 1 to 4 C atoms. Preference is given to the vinyl group, 3-methacryloyloxypropyl, (meth)acryloyloxymethyl and 3-acryloyloxypropyl group.

The most preferred are α,ω-divinyl-polydimethylsiloxanes, α,ω-di(3-acryloyloxypropyl)-polydimethylsiloxanes, α,ω-di(3-methacryloyloxypropyl)-polydimethylsiloxanes.

In the case of the silicones substituted only singly by unsaturated groups, particular preference is given to α-monovinyl-polydimethylsiloxanes, α-mono(3-acryloyloxypropyl)-polydimethylsiloxanes, α-mono(acryloyloxymethyl)-polydimethylsiloxanes, α-mono(methacryloyloxymethyl)-polydimethylsiloxanes, α-mono(3-methacryloyloxypropyl)-polydimethylsiloxanes. In the case of the mono-functional polydimethylsiloxanes there is an alkyl or alkoxy radical on the other end of the chain, a methyl or butyl radical for example.

Where appropriate it is also possible for 0.1% to 20% by weight based on the total weight of the monomers, of auxiliary monomers to be copolymerized. It is preferred to use 0.5% to 5% by weight of auxiliary monomers. Examples of auxiliary monomers are ethylenically unsaturated monocarboxylic and dicarboxylic acids, preferably acrylic acid, methacrylic acid, fumaric acid and maleic acid; ethylenically unsaturated carboxamides and carbonitriles, preferably acrylamide and acrylonitrile; monoesters and diesters of fumaric acid and maleic acid, such as the diethyl and diisopropyl esters, and also maleic anhydride, ethylenically unsaturated sulfonic acids and their salts, preferably vinylsulfonic acid, 2-acrylamido-2-methylpropanesulfonic acid. Further examples are pre-crosslinking comonomers such as multiply ethylenically unsaturated comonomers, examples being divinyl adipate, diallyl maleate, allyl methacrylate or triallyl cyanurate, hexanediol diacrylate, or postcrosslinking comonomers, examples being acrylamidoglycolic acid (AGA), methylacrylamidoglycolic acid methyl ester (MAGME), N-methylolacrylamide (NMA), N-methylolmethacrylamide, N-methylolallylcarbamate, alkyl ethers such as the isobutoxy ether or esters of N-methylolacrylamide, of N-methylolmethacrylamide and of N-methylolallylcarbamate.

Suitable auxiliary monomers are also epoxide-functional comonomers such as glycidyl methacrylate and glycidyl acrylate. Mention may also be made of monomers with hydroxyl or CO groups, examples being methacrylic and acrylic hydroxyalkyl esters such as hydroxyethyl, hydroxypropyl or hydroxybutyl acrylate or methacrylate, and also compounds such as diacetoneacrylamide and acetylacetoxyethyl acrylate or methacrylate. Further particularly preferred auxiliary monomers are ethylenically unsaturated silanes of the general formula (R5)4-m-Si—(OR6)m, where m is a number of 1, 2, or 3 in value, R5 is an organofunctional radical selected from the group of methacryloyloxy radical, acryloyloxy radical, vinyl radical, allyl radical, and mercapto radical, it being possible for the radical R5 to be attached directly to the silicon atom or to be separated from it by a carbon chain of 1 to 6 C atoms which may be interrupted by oxygen —O—, sulfur —S— or amine —NR6—, and R6 is a monovalent linear or branched aliphatic or cycloaliphatic hydrocarbon radical or a monovalent aromatic hydrocarbon radical or a radical —C(=O)—R7, where R7 is a monovalent linear or branched aliphatic or a cycloaliphatic hydrocarbon radical or a monovalent aromatic hydrocarbon radical. The selected silane or, where appropriate, the selected silanes may be present in a nonhydrolyzed form, in hydrolyzed form or in a hydrolyzed and partly condensed or hydrolyzed and condensed form, or in a mixture of these forms.

Particularly preferred combinations of the above-recited monomers are one or more monomers from the group of vinyl acetate, vinyl esters of α-branched monocarboxylic acids having 9 to 11 C atoms, vinyl chloride, ethylene, methyl acrylate, methyl methacrylate, ethyl acrylate, ethyl methacrylate, propyl acrylate, propyl methacrylate, n-butyl acrylate, n-butyl methacrylate, 2-ethylhexyl acrylate, styrene, 1,3-butadiene.

Particularly preferred as monomers are also mixtures of vinyl acetate and ethylene; mixtures of vinyl acetate, ethylene and a vinyl ester of α-branched monocarboxylic acids having 9 to 11 C atoms;

mixtures of n-butyl acrylate and 2-ethylhexyl acrylate and/or methyl methacrylate;

mixtures of styrene and one or more monomers from the group of methyl acrylate, ethyl acrylate, propyl acrylate, n-butyl acrylate, 2-ethylhexyl acrylate;

mixtures of vinyl acetate and one or more monomers from the group of methyl acrylate, ethyl acrylate, propyl acrylate, n-butyl acrylate, 2-ethylhexyl acrylate, and where appropriate, ethylene;

mixtures of 1,3-butadiene and styrene and/or methyl methacrylate;

it being possible for the stated mixtures, where appropriate, further to comprise one or more of the abovementioned auxiliary monomers or macromers.

The monomer selection and the selection of the weight fractions of the comonomers are made so as to result in general in a glass transition temperature Tg of $\leq 110°$ C., preferably $-50°$ C. to $+60°$ C. The glass transition temperature, Tg, of the polymers can be determined in a known way by means of differential scanning calorimetry (DSC). The Tg may also be calculated approximately in advance by means of the Fox equation. According to Fox T. G., Bull. Am. Physics Soc. 1,3, page 123 (1956) it is the case that: $1/Tg = x1/Tg1 + x2/Tg2 + \ldots + xn/Tgn$, where xn is the mass fraction (% by weight/100) of the monomer n and Tgn is the glass transition temperature in Kelvins, of the homopolymer of the monomer n. Tg values for homopolymers are listed in Polymer Handbook 2nd edition, J. Wiley & Sons, New York (1975).

Under operating conditions, the continuous phase is in the liquid aggregate state. The continuous phase is selected such that it is immiscible with the disperse phase, in other words with the monomers and the polymers formed in the polymerization, under the operating conditions. The monomers used in the polymerization, and the polymers formed, ought preferably, under the polymerization conditions, to be soluble in the continuous phase to an extent of not more than 1% by weight, preferably not more than 0.1% by weight, based in each case on the total weight of monomers and polymer. If auxiliary monomers are copolymerized, their proportion is chosen such that the values identified above are not exceeded.

The continuous phase may be composed of one substance or of a mixture of substances. The continuous phase generally has, under a pressure of 1 bar, a melting point of $\geq -130°$ C. and a boiling point $\leq 250°$ C., preferably a melting point $\geq -100°$ C. and a boiling point $\leq 150°$ C., most preferably a melting point $>-20°$ C. and a boiling point $\leq 110°$ C.

Depending on the selection of the monomers, suitability as a continuous phase is possessed by water, alcohols, ethers, aldehydes, ketones, aromatic hydrocarbons, aliphatic hydrocarbons, partly fluorinated or perfluorinated hydrocarbons, esters and amides, and also supercritical media, examples being carbon dioxide or ammonia. Ionic liquids are also suitable, such as N-butylimidazolium hexafluorophosphate. Likewise suitable are mixtures of these classes of substance. Particular suitability is possessed by water, and also aliphatic and aromatic alcohols, especially methanol, ethanol and isopropanol, and toluene, and also mixtures of the stated classes of substance and substances.

The disperse phase is generally generated in the continuous phase using one or more dispersants. Dispersants which can be used are all customarily used emulsifiers and/or protective colloids. Suitable protective colloids are, for example partially hydrolyzed polyvinyl alcohols, polyvinylpyrrolidones, polyvinyl acetals, and also starches and celluloses and their carboxymethyl, methyl, hydroxyethyl, and hydroxypropyl derivatives. Suitable emulsifiers are not only anionic and cationic but also nonionic emulsifiers, examples being anionic surfactants, such as alkyl sulfates having a chain length of 8 to 18 C atoms, alkyl or alkylaryl ether sulfates having 8 to 18 C atoms in the hydrophobic radical and up to 60 ethylene oxide or propylene oxide units, alkyl- or alkylarylsulfonates having 8 to 18 C atoms, esters and monoesters of sulfosuccinic acid with monohydric alcohols or alkylphenols, or nonionic surfactants such as alkyl polyglycol ethers or alkylaryl polyglycol ethers having up to 60 ethylene oxide and/or propylene oxide units. Further emulsifiers and protective colloids that can be used are found in "McCutchen's Detergents and Emulsifiers", North American edition, 1979. The protective colloids and/or emulsifiers are added generally in an amount of 1% to 20% by weight in total, based on the total weight of the monomers, in the polymerization.

For dispersing the disperse phase in the continuous phase, standard methods are employed, depending on the nature of the heterophase polymerization. These methods include stirring by means of stirring mechanisms, homogenizing by means of rotor-stator devices (e.g. Ultra-Turrax®), homogenizing by means of speed mixers, dissolvers, high-pressure homogenizers or ultrasound devices.

The weight ratio between continuous phase and disperse phase generally takes on values of 90:10 to 30:70. The ratio is preferably from 80:20 to 40:60. Particular preference is given to a ratio of 70:30 to 45:55.

The heterophase polymerization may take place by means of the known techniques of suspension, microsuspension, emulsion or miniemulsion polymerization. In one particularly preferred form the reaction is carried out by the methodology of miniemulsion polymerization in water (cf., e.g. K. Landfester, "Polyreactions in Miniemulsions", Macromol. Rapid. Commun. 2001, 22, 896-936 and M. S. El-Aasser, E. D. Sudol, "Miniemulsions: Overview of Research and Applications" 2004, JCT Research, 1, 20-31).

Where the reaction is to be performed by the process of miniemulsion polymerization in water, it is possible if appropriate to add, to the components set out above, hydrophobic, nonpolymerizable additions in amounts of 0.1 to 3% by weight, based on disperse phase, which prevent diffusion processes (Ostwald ripening). Hydrophobic in this context means that the respective addition has a solubility of $\leq 10-6$ g/l in water under standard conditions. Examples of these additions are hydrophobic substances such as hexadecane, cetyl alcohol, oligomeric cyclosiloxanes such as octamethylcyclotetrasiloxane, for example, polydimethylsiloxanes, but also vegetable oils such as rapeseed oil, sunflower oil or olive oil. Additionally suitable are organic or inorganic polymers having a number-average molecular weight of <10 000 g/mol.

Preferred hydrophobic additions are polyorganosiloxanes, and also D3, D4 and D5 rings and hexadecane. Polyorganosiloxanes and hexadecane are particularly preferred.

The initiation of the polymerization takes place, depending on the type of heterophase polymerization, by means of the customary initiator systems familiar to a person skilled in the art, of the kind described, for example, in "Handbook of Free Radical Initiators", by E. T. Denisov, T. G. Denisova and T. S. Pokidova, Wiley, 2003.

Examples of water-soluble initiators for the emulsion or miniemulsion polymerization are the sodium, potassium, and ammonium salts of peroxodisulfuric acid, hydrogen peroxide, tert-butyl hydroperoxide, potassium peroxodiphosphate, 4,4'-azobis(4-cyanovaleric acid).

Examples of predominantly oil-soluble initiators for the suspension or microsuspension polymerization are tert-butyl peroxide, cumene hydroperoxide, dilauroyl peroxide, tert-butyl peroxybenzoate, isopropylbenzene monohydroperoxide, dibenzoyl peroxide or azobisisobutyronitrile, tert-butyl peroxipivalate.

Preferred initiators for miniemulsion polymerizations are potassium persulfate, ammonium persulfate, azobisisobutyronitrile, and dibenzoyl peroxide.

The stated initiators are used preferably in amounts of 0.01% to 4.0% by weight, based on the total weight of the monomers.

The initiators can also be used in combination with a reducing agent. Suitable reducing agents are sulfites and bisulfites of monovalent cations, an example being sodium sulfite, the derivatives of sulfoxylic acid such as zinc or alkali metal formaldehyde-sulfoxylates, an example being sodium hydroxymethanesulfinate and ascorbic acid. The amount of reducing agent is preferably 0.15% to 3% by weight of the amount of monomer employed. Additionally, it is possible to introduce small amounts of a metal compound which is soluble in the polymerization medium and whose metal component is redox-active under the polymerization conditions, based for example on iron or on vanadium. One particularly preferred initiator system comprising the components referred to above is the tert-butyl hydroperoxide/sodium hydroxymethanesulfinate/Fe(EDTA)2+/3+ system.

Suitable additives soluble in the continuous phase and insoluble in the dispersed phase, which terminate the polymerization of the ethylenically unsaturated monomers in the continuous phase, are those which under polymerization conditions are soluble in the continuous phase to an extent of at least 1 g g/l and soluble in the disperse phase to an extent of not more than 0.1 g/l. These additives have the effect that the polymerization takes place substantially in the disperse phase, i.e. is prevented in the continuous phase.

Suitable additives are ethylenically unsaturated compounds which exhibit unfavorable copolymerization characteristics with the monomers of the disperse phase, i.e. which do not permit cross-polymerization with monomers of the disperse phase. Suitability is possessed, for example, by styryl-group-bearing polar or salt-like compounds. One example thereof is sodium styrylsulfonate in the polymerization of vinyl esters, especially of vinyl acetate. Suitable compounds can therefore be determined in accordance with the nature of the monomers, via the copolymerization parameters. The copolymerization parameters can be determined experimentally or can be looked up in the Polymer Handbook 2nd Edition, J. Wiley & Sons, New York (1975).

The reaction temperatures are between 0° C. and 200° C., preferably between 5° C. and 80° C., more preferably between 30° C. and 70° C. The polymerization may be carried out batchwise or continuously, with initial introduction of all or some constituents of the reaction mixture, with partial initial introduction and subsequent metering of individual constituents of the reaction mixture, or by the metering method without an initial charge. All of the metered additions take place preferably at the rate at which the respective component is consumed.

In one preferred embodiment the additive of the invention is at least partially dissolved in the continuous phase before the polymerization is commenced.

The reaction may take place in an open system or in a closed system. Preference is given to a reaction under atmospheric pressure in an open system, but the reaction can also, as a function of the monomers used, in a manner familiar to a person skilled in the art, at pressures of up to 150 bar. Additionally possible is a reaction under pressure and temperature conditions in which the continuous medium is present in the supercritical state.

The heterophase polymerization takes place preferably in water as a continuous phase. The polymer dispersions obtainable therewith can be used as they are, in the application fields typical thereof or in the form of their water-redispersible polymer powders. To prepare redispersible polymer powders, the aqueous dispersions of the polymers prepared by the process of the invention are dried in a way which is known to a person skilled in the art, preferably by the spray-drying method.

Typical fields of use for polymers in the form of their aqueous dispersions and water-redispersible polymer powders are their use in chemical products for the construction industry, where appropriate in conjunction with hydraulically setting binders such as cements (Portland, aluminate, trass, slag, magnesia, and phosphate cement), gypsum and water glass, for producing construction adhesives, especially tile adhesives and exterior insulation and finishing adhesives, renders, filler compounds, trowel-applied flooring compounds, leveling compounds, nonshrink grouts, jointing mortars and paints. Furthermore, use as binders for coating materials and adhesive-bonding agents, or as coating materials and/or binders for textiles and paper. The polymers obtainable by the process of the invention can also be used as pure material that forms a film over substrates or cures to blocks or other, arbitrary forms.

EXAMPLES

The polymerization process of the invention is illustrated below with reference to examples. All of the reactions took place under a nitrogen atmosphere at atmospheric pressure, unless indicated otherwise. Unless indicated otherwise, monomers and initiators were used without cleaning steps or drying steps beforehand.

The homogenizing apparatus employed was an ultrasound homogenizer from Branson Digital Sonifier 250, with a maximum output of 200 watts. Particle size determinations were made via light scattering experiments on a Zetasizer Nano-S ZEN 1600 from Malvern Instruments.

Inventive Example 1/Comparative Example 1

System: vinyl acetate/water Initiator: potassium persulfate

An emulsion was prepared consisting of 80 g of deionized water, 20 g of vinyl acetate, 1 g of sodium styrenesulfonate, 2 g of sodium dodecyl sulfate, and 1 g of hexadecane. This emulsion was then homogenized by ultrasonic cavitation (70% output) over a period of 10 minutes. The resulting emulsion is admixed with 0.1 g of potassium persulfate and polymerized with stirring at 70° C. for a time of 6 h (1). In a further, comparative approach (C1) the procedure was identical, but without the addition of sodium styrylsulfonate. Both times the product was a polymer dispersion having a solids content of 24%. The particle sizes and particle count were as follows:

| Example | Particles monomer emulsion Size [nm] | Particles monomer emulsion Number [10¹⁷] | Particles polymer dispersion Size [nm] | Particles polymer dispersion Number [10¹⁷] | Particle number ratio emulsion/dispersion |
|---|---|---|---|---|---|
| 1  | 24  | 29.6  | 291 | 0.013 | 2273 |
| C1 | 134 | 0.170 | 98  | 0.341 | 0.5  |

Example 1 illustrates that the presence of the styrenesulfonate which is not copolymerizable with vinyl acetate means that nucleation and polymerization in the water phase are completely suppressed. As a result of the transport of vinyl acetate through the water phase which still takes place, this leads to a rapid decrease in the particle count. In comparative example C1, the particle count doubles as a result of polymerization and associated renucleation in the water phase.

Comparative Examples 2 and 3

System: styrene/water Initiator: potassium persulfate

An emulsion was prepared consisting of 80 g of deionized water, 20 g of styrene, 1 g of sodium styrenesulfonate, 2 g of sodium dodecyl sulfate, and 1 g of hexadecane. This emulsion was then homogenized by ultrasonic cavitation (70% output) over a period of 10 minutes. The resulting emulsion is admixed with 0.1 g of potassium persulfate and polymerized with stirring at 70° C. for a time of 6 h (C2). In a further comparative approach (C3) the procedure was identical, but without the addition of sodium styrylsulfonate. Both times the product was a polymer dispersion having a solids content of 24%. The particle sizes and particle count were as follows:

| Example | Particles monomer emulsion Size [nm] | Particles monomer emulsion Number [10¹⁷] | Particles polymer dispersion Size [nm] | Particles polymer dispersion Number [10¹⁷] | Particle number ratio emulsion/dispersion |
|---|---|---|---|---|---|
| C2 | 232 | 0.0337 | 42 | 4.96 | 0.01 |
| C3 | 43  | 5.28   | 61 | 1.62 | 3    |

Comparative example C2 illustrates that the presence of styrenesulfonate which is copolymerizable with styrene, means that nucleation occurs to an increased extent in the water phase, as a result of which the number of particles grows in the course of the polymerization. In this case, styrenesulfonate is not a suitable additive. In comparison between C2 and C3 it becomes clear that the presence of styrenesulfonate leads in fact to renucleation in the water phase to an increased extent.

The invention claimed is:

1. A process for free-radically initiated heterophase polymerization, comprising polymerization of one or more ethylenically unsaturated monomers in a phase dispersed in the continuous phase, characterized in that, before or during the polymerization, one or more additives which are soluble in the continuous phase and insoluble in the dispersed phase are added which terminate the polymerization of the ethylenically unsaturated monomers in the continuous phase additives added, the one or more additives being selected from the group consisting of styryl-group-bearing polar or salt-like compounds which have unfavorable copolymerization characteristics with the monomers of the disperse phase;
wherein the ethylenically unsaturated monomers are selected from the group consisting of one or more vinyl esters of unbranched or branched alkylcarboxylic acids having 1 to 15 C atoms; mixtures consisting of vinyl acetate and ethylene; mixtures consisting of vinyl acetate, ethylene, and a vinyl ester of α-branched monocarboxylic acids having 9 to 11 C atoms; and mixtures consisting of vinyl acetate and one or more monomers from the group consisting of methyl acrylate, ethyl acrylate, propyl acrylate, n-butyl acrylate, 2-ethylhexyl acrylate, and optionally ethylene; wherein the ethylenically unsaturated monomers may optionally include macromers and/or 0.1% to 20% by weight of one or more auxiliary monomers, based on the total weight of the monomers.

2. The process of claim 1, characterized in that water, aliphatic and aromatic alcohols or mixtures thereof are present as continuous phase.

3. The process of claim 1, characterized in that the heterophase polymerization takes place by means of suspension, microsuspension, emulsion or miniemulsion polymerization.

4. The process of claim 1, characterized in that the heterophase polymerization takes place by means of miniemulsion polymerization in water.

5. The process of claim 4, characterized in that the miniemulsion polymerization takes place in the presence of hydrophobic, nonpolymerizable additions.

6. The process of claim 1, characterized in that further ethylenically unsaturated monomers polymerized are one or more monomers from the group containing esters, methacrylic esters and acrylic esters of unbranched or branched alcohols having 1 to 15 C atoms, vinylaromatics, olefins, dienes or vinyl halides.

7. The process of claim 1, characterized in that macromers are copolymerized, having the general formula $R^1_a R_{3-a} SiO(SiR_2O)_n SiR_{3-a} R^1_a$, where R is alike or different and is a monovalent, optionally substituted, alkyl radical or alkoxy radical having in each case 1 to 18 C atoms, $R^1$ is a polymerizable group, a is 0 or 1, and at least one a is 1, and n is 5 to 10 000.

* * * * *